United States Patent
De Diego Calderon et al.

(10) Patent No.: US 11,987,857 B2
(45) Date of Patent: May 21, 2024

(54) COLD ROLLED AND ANNEALED STEEL SHEET, METHOD OF PRODUCTION THEREOF AND USE OF SUCH STEEL TO PRODUCE VEHICLE PARTS

(71) Applicant: ArcelorMittal, Luxembourg (LU)

(72) Inventors: Irène De Diego Calderon, Metz (FR); Jean-Christophe Hell, Metz (FR)

(73) Assignee: ArcelorMittal, Luxembourg (LU)

( * ) Notice: Subject to any disclaimer, the term of this patent is extended or adjusted under 35 U.S.C. 154(b) by 153 days.

(21) Appl. No.: 17/297,292

(22) PCT Filed: Dec. 2, 2019

(86) PCT No.: PCT/IB2019/060361
§ 371 (c)(1),
(2) Date: May 26, 2021

(87) PCT Pub. No.: WO2020/115637
PCT Pub. Date: Jun. 11, 2020

(65) Prior Publication Data
US 2022/0025478 A1   Jan. 27, 2022

(30) Foreign Application Priority Data
Dec. 4, 2018   (WO) .................. PCT/IB2018/059625

(51) Int. Cl.
| | | |
|---|---|---|
| C21D 9/46 | (2006.01) | |
| B32B 15/01 | (2006.01) | |
| C21D 6/00 | (2006.01) | |
| C21D 8/02 | (2006.01) | |
| C22C 38/00 | (2006.01) | |
| C22C 38/02 | (2006.01) | |
| C22C 38/04 | (2006.01) | |
| C22C 38/06 | (2006.01) | |

(52) U.S. Cl.
CPC .............. *C21D 9/46* (2013.01); *B32B 15/013* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0268* (2013.01); *C21D 8/0273* (2013.01); *C22C 38/001* (2013.01); *C22C 38/002* (2013.01); *C22C 38/02* (2013.01); *C22C 38/04* (2013.01); *C22C 38/06* (2013.01); *C21D 2211/001* (2013.01); *C21D 2211/004* (2013.01); *C21D 2211/005* (2013.01)

(58) Field of Classification Search
CPC .......... C21D 9/46; C21D 6/005; C21D 6/008; C21D 8/0205; C21D 8/0236; C21D 2211/001; C21D 2211/004; C21D 2211/005; B32B 15/013; C22C 38/001; C22C 38/002; C22C 38/02; C22C 38/04; C22C 38/06
USPC ....................................................... 428/659
See application file for complete search history.

(56) References Cited

U.S. PATENT DOCUMENTS

| | | |
|---|---|---|
| 4,865,662 A | 3/1989 | Zimmer |
| 11,486,017 B2 | 11/2022 | Soler et al. |
| 2003/0145911 A1 | 8/2003 | Engl et al. |
| 2016/0319388 A1 | 11/2016 | Kim et al. |
| 2018/0100220 A1 | 4/2018 | Cha et al. |
| 2018/0276910 A1 | 9/2018 | Pitt et al. |
| 2019/0300978 A1 | 10/2019 | Soler et al. |

FOREIGN PATENT DOCUMENTS

| | | | |
|---|---|---|---|
| CN | 103820735 A | 5/2014 | |
| EP | 3088548 A1 | 11/2016 | |
| JP | 2006 176 843 A | 7/2006 | |
| JP | 2017507242 A | 3/2017 | |
| JP | 2019520478 A | 7/2019 | |
| JP | 2019521248 A | 7/2019 | |
| JP | 2019522723 A | 8/2019 | |
| KR | 2014-0080924 A | 7/2014 | |
| WO | WO 91/03579 A1 | 3/1991 | |
| WO | WO 2017148892 A1 | 9/2017 | |
| WO | WO-2017203311 A1 * | 11/2017 | ............. C21D 6/005 |
| WO | WO2017203345 A1 | 11/2017 | |
| WO | WO2017203346 A1 | 11/2017 | |
| WO | WO2017203347 A1 | 11/2017 | |

OTHER PUBLICATIONS

See Search Report of PCT/IB2018/060361 dated Feb. 20, 2020.

* cited by examiner

*Primary Examiner* — Katherine A Christy
(74) *Attorney, Agent, or Firm* — Davidson Kappel LLC

(57) ABSTRACT

A cold rolled and annealed steel sheet including by weight: $0.6<C<1.3\%$, $15 \leq Mn<35\%$, $6 \leq Al<15\%$, $Si \leq 2.40\%$, $S \leq 0.03\%$, $P \leq 0.1\%$, $N \leq 0.1\%$, possibly one or more optional elements chosen among Ni, Cr and Cu in an individual amount of up to 3% and possibly one or more elements chosen among B, Ta, Zr, Nb, V, Ti, Mo, and W in a cumulated amount of up to 2.0%, the remainder of the composition making up of iron and inevitable impurities resulting from the elaboration, the microstructure of the sheet including of ordered ferrite between 1% and 10%, optionally of up to 10% of kappa carbides, the remainder being made of austenite, and, the density of the steel sheet being equal or below 7.2 and the FWHM for the austenite matrix is between 0.700 and 1.100.

17 Claims, No Drawings

COLD ROLLED AND ANNEALED STEEL SHEET, METHOD OF PRODUCTION THEREOF AND USE OF SUCH STEEL TO PRODUCE VEHICLE PARTS

The present invention deals with a low density steel sheet presenting a microstructure mainly comprising austenite. The steel sheet according to the invention is particularly well suited for the manufacture of safety or structural parts for vehicles such as land motor vehicles.

BACKGROUND

Environmental restrictions are forcing automakers to continuously reduce the $CO_2$ emissions of their vehicles. To do that, automakers have several options, whereby their principal options are to reduce the weight of the vehicles or to improve the efficiency of their engine systems. Advances are frequently achieved by a combination of the two approaches. This invention relates to the first option, namely the reduction of the weight of the motor vehicles. In this very specific field, there is a two-track alternative:

The first track consists of reducing the thicknesses of the steels while increasing their levels of mechanical strength. Unfortunately, this solution has its limits on account of a prohibitive decrease in the rigidity of certain automotive parts and the appearance of acoustical problems that create uncomfortable conditions for the passenger, not to mention the unavoidable loss of ductility associated with the increase in mechanical strength.

The second track consists of reducing the density of the steels by alloying them with other, lighter metals. Among these alloys, the low-density ones have attractive mechanical and physical properties while making it possible to significantly reduce the weight.

In particular, US 2003/0145911 discloses a Fe—Al—Mn—Si light steel having good formability and high strength. However, the ultimate tensile strength of such steels does not go beyond 800 MPa which does not allow taking full advantage of their low density for parts of all kinds of geometry.

SUMMARY OF THE INVENTION

It is an object of the present invention to provide a steel sheet presenting a density below 7.2, an ultimate tensile strength of at least 1000 MPa, and a tensile elongation of at least 15%.

In a preferred embodiment, the steel sheet presents a density equal or below 7.1 or even equal or below 7.0, an ultimate tensile strength of at least 1000 MPa, a yield strength of at least 750 MPa and a tensile elongation of at least 18%.

The present invention provides a cold rolled and annealed steel sheet comprising by weight:
0.6<C<1.3%,
15≤Mn<35%,
6≤Al<15%,
Si≤2.40%
S≤0.03%,
P≤0.1%,
N≤0.1%,
possibly one or more optional elements chosen among Ni, Cr and Cu in an individual amount of up to 3% and possibly one or more elements chosen among B, Ta, Zr, Nb, V, Ti, Mo, and W in a cumulated amount of up to 2.0%, the remainder of the composition making up of iron and inevitable impurities resulting from the elaboration, the microstructure of said sheet comprising of ordered ferrite between 1% and 10%, optionally of up to 10% of kappa carbides, the remainder being made of austenite, and, the density of said steel sheet being equal or below 7.2 and the FWHM for the austenite matrix is between 0.700 and 1.100.

The present invention also provides method for producing a steel sheet comprising the following steps:
feeding a slab which composition as described above,
reheating such slab at a temperature above 1000° C. and hot rolling it with a final rolling temperature of at least 800° C.,
coiling the hot rolled steel sheet at a temperature below 600° C.,
first cold-rolling of such hot rolled steel sheet at a reduction comprised between 30% and 80%,
first annealing of such cold rolled sheet by heating it up to an annealing temperature comprised between 700° C. and 1000° C., holding it at such temperature during less than 5 minutes and cooling it at a rate of at least 30° C./s,
second cold-rolling of such annealed steel sheet at a reduction comprised between 10% and 50%,
second annealing of such cold sheet by heating it up to an annealing temperature comprised between 700° C. and 880° C., holding it at such temperature during 1 minute to 150 hours and cooling it at a rate of at least 30° C./s.

The present also provides a vehicle comprising such a part.

Other characteristics and advantages of the invention will become apparent from the following detailed description of the invention.

DETAILED DESCRIPTION

Without willing to be bound by any theory it seems that the low density steel sheet according to the invention allows for an improvement of the mechanical properties thanks to this specific microstructure.

Regarding the chemical composition of the steel, carbon plays an important role in the formation of the microstructure and reaching of the targeted mechanical properties. Its main role is to stabilize austenite which is the main phase of the microstructure of the steel as well as to provide strengthening. Carbon content below 0.6% will decrease the proportion of austenite, which leads to the decrease of both ductility and strength of the alloy.

As a main constituent element of the kappa carbide $(Fe,Mn)_3AlC_x$, carbon promotes the precipitation of such carbides. However, a carbon content above 1.3% can promote the precipitation of such carbides in a coarse manner on the grain boundaries, which results in the decrease of the ductility of the alloy.

Preferably, the carbon content is between 0.8% and 1.3%, more preferably between 0.8% and 1.0% by weight so as to obtain sufficient strength.

Manganese is an important alloying element in this system, mainly due to the fact that alloying with very high amounts of manganese and carbon stabilizes the austenite down to room temperature, which can then tolerate high amounts of aluminum without being destabilized and transformed to ferrite or martensite. To enable the alloy to have a superior ductility, the manganese content has to be equal or higher to 15%. However, when the manganese content is over 35%, the precipitation of β-Mn phase will deteriorate the ductility of the alloy.

Therefore, the manganese content should be controlled to be equal or greater than 15%, but lower than or equal to 35%. In a preferred embodiment, it is equal or greater than 15.5% or even greater than 16%. Its amount is more preferably between 18% and 30% and even between 18% and 25%.

Aluminum addition to high manganese austenitic steels effectively decreases the density of the alloy. In addition, it considerably increases the stacking fault energy (SFE) of the austenite, leading in turn to a change in the strain hardening behavior of the alloy. Aluminum is also one of the primary elements of nanosized kappa carbide $(Fe,Mn)_3AlC_x$ and therefore its addition significantly enhances the formation of such carbides. The aluminum concentration of the present alloys should be adjusted, on one hand, to guarantee the austenite stability and the precipitation of kappa carbides, and on the other hand to control the formation of ferrite. Therefore, the aluminum content should be controlled to be equal or greater than 6%, but lower than or equal to 15%. In a preferred embodiment, aluminum content is between 6% and 12% and preferably between 6% and 10%.

Silicon is a common alloying element for high manganese and aluminium steels. It has a very strong effect on the formation of ordered ferrite $DO_3$. Besides, silicon was shown to enhance the activity of carbon in austenite and to increase the partitioning of carbon into the kappa carbides. In addition, silicon has been described as an effective alloying element that can be used to delay or prevent the precipitation of brittle β-Mn phase. However, above a content of 2.40%, it reduces the elongation and tends to form undesirable oxides during certain assembly processes, and it must therefore be kept below this limit. Preferably, the content of silicon is below 2.0% and advantageously below 1.0%.

Sulfur and phosphorus are impurities that embrittle the grain boundaries. Their respective contents must not exceed 0.03% and 0.1% so as to maintain sufficient hot ductility.

Nitrogen content must be 0.1% or less so as to prevent the precipitation of AlN and the formation of volume defects (blisters) during solidification.

Nickel has a positive effect on penetration of hydrogen into the steel and, therefore it can be used as a diffusion barrier to hydrogen. Nickel can also be used as an effective alloying element because it promotes the formation of ordered compounds in ferrite, such as the B2 component, leading to additional strengthening. However, it is desirable, among others for cost reasons, to limit the nickel addition to a maximum content of 4% or less and preferably between 0.1% and 2.0%. In another embodiment, the nickel amount is below 0.1%.

Chromium may be used as optional element for increasing the strength of the steel by solution hardening. It also enhances the high temperature corrosion resistance of the steels according to the invention. However, since chromium reduces the stacking fault energy, its content must not exceed 4% and preferably is between 0.1% and 2.0% or between 0.1% and 1.0%. In another embodiment, the chromium amount is below 0.1%.

Likewise, optionally, an addition of copper with a content not exceeding 4% is one means of hardening the steel by precipitation of copper-rich precipitates. However, above this content, copper is responsible for the appearance of surface defects in hot-rolled sheet. Preferably, the amount of copper is between 0.1% and 2.0%, or between 0.1% and 1.0%. In another embodiment, the copper amount is below 0.1%.

Boron has a very low solid solubility and a strong tendency to segregate at the grain boundaries, interacting strongly with lattice imperfections. Therefore, boron can be used to limit the precipitation of intergranular kappa carbides. Preferably, the amount of boron is below 0.1%.

Niobium can simultaneously increase strength and toughness in the steel since it is an effective grain refiner. In addition, tantalum, zirconium, niobium, vanadium, titanium, molybdenum and tungsten are also elements that may optionally be used to achieve hardening and strengthening by precipitation of nitrides, carbo-nitrides or carbides. However, when their cumulated amount is above 2.0%, preferably above 1.0%, there is a risk that an excessive precipitation may cause a reduction in toughness, which has to be avoided.

The microstructure of the steel sheet according to the invention comprises, ferrite between 1% and 10%, optionally of kappa carbides up to 10%, the remainder being made of austenite.

The austenitic matrix is present as a primary phase of the steel of the present invention and is present in minimum at 90% by volume fraction in the steel of the present invention and preferably between 90% and 98% by volume fraction. The austenite of the present invention preferably has an average grain size below 12 μm and more preferably below 10 μm. The strain state of the austenite of the present invention is estimated by X-ray diffraction through the measurement of the full width at half maximum (FWHM) of the diffraction peak corresponding to the {311} planes. X-ray diffraction is a non-destructive analytical technique which provides detailed information about the internal lattice of crystalline substances, including lattice dimensions, bond-lengths, bond-angles, and details of site-ordering. Directly related is single-crystal refinement, where the data generated from the X-ray analysis is interpreted and refined to obtain the crystal structure. Usually, an X-ray diffractometer is the tool used for identifying such crystal structure. According to the present invention, the steel sheet has an austenitic matrix, the austenitic matrix having a face-centered cubic system. Thus, the analyzed diffraction peak whose full width at half maximum FWHM is measured corresponds to the {311} planes which is believed being the most sensitive to the strain state of the austenitic lattice, thus is the best representative of the dislocation density impact. The FWHM of the austenite of the present invention is between 0.700° and 1.100°.

Ferrite is present in the microstructure of the sheet according to the invention between 1% and 10% in volume fraction, preferably between 2% and 10% or more preferably between 3% and 9%. However, the ferrite of the present invention has a morphology which is limited to a granular geometry, excluding ferrite in form of bands, as they drastically degrade the ductility and formability of the steel. Preferably, the ferritic grains have an average grain size below 5 μm and more preferably below 1 μm. Such ferrite can be under the form of regular disordered ferrite α or ordered as a B2 structure with a (Fe,Mn)Al composition or as a $DO_3$ structure with a $(Fe,Mn)_3Al$ composition is also possible, so that α, B2 and $DO_3$ structures can, in general, be observed in the steel according to the invention.

The kappa carbides $(Fe,Mn)_3AlC_x$ may be present in the microstructure of the steel sheet according to the invention, up to 10% in volume fraction, preferably less than 5%, more preferably less than 4% and advantageously of more than 1%. The kappa carbides of the present invention include both intragranular kappa carbides (i.e. precipitate inside the austenitic grains so called intragranular kappa carbides) and intergranular kappa carbides (i.e. precipitate on the austenitic grain boundaries so called intergranular kappa carbides). The homogenous and coherent precipitation of the nanosized kappa carbide increases the strength of the alloy.

To protect the steel sheet according to the invention from corrosion, in a preferred embodiment, the steel sheet is covered by a metallic coating. The metallic coating can be an aluminum-based coating or a zinc-based coating.

Preferably, the aluminum-based coating comprises less than 15% Si, less than 5.0% Fe, optionally 0.1% to 8.0% Mg and optionally 0.1% to 30.0% Zn, the remainder being Al.

Advantageously, the zinc-based coating comprises 0.01-8.0% Al, optionally 0.2-8.0% Mg, the remainder being Zn.

The steel sheet according to the invention can be produced by any appropriate manufacturing method and the man skilled in the art can define one. It is however preferred to use the method according to the invention, which comprises the following steps:

- feeding a slab which composition is according to the invention,
- reheating such slab at a temperature above 1000° C. and hot rolling it with a final rolling temperature of at least 800° C.,
- coiling the hot rolled steel sheet at a temperature below 600° C.,
- first cold-rolling of such hot rolled steel sheet at a reduction comprised between 30% and 80%,
- first annealing of such cold rolled sheet by heating it up to an annealing temperature comprised between 700° C. and 1000° C., holding it at such temperature during less than 5 minutes and cooling it at a rate of at least 30° C./s,
- second cold-rolling of such annealed steel sheet at a reduction comprised between 10% and 50%,
- second annealing of such cold sheet by heating it up to an annealing temperature comprised between 700° C. and 880° C., holding it at such temperature during 1 minute to 150 hours and cooling it at a rate of at least 30° C./s.

The steel sheets according to the present invention are preferably produced through a method in which a semi product, such as slabs, thin slabs, or strip made of a steel according to the present invention having the composition described above, is cast, the cast input stock is heated to a temperature above 1000° C., preferably above 1050° C. and more preferably above 1100° C. or 1150° C. or used directly at such a temperature after casting, without intermediate cooling.

The hot-rolling step is performed at a temperature above 800° C. To avoid any cracking problem through lack of ductility by the formation of ferrite in bands, the final rolling temperature is preferably above or equal to 850° C.

After the hot-rolling, the strip has to be coiled at a temperature below 600° C. and preferably above 350° C. In a preferred embodiment, the coiling is performed between 350° C. and 450° C. to avoid excessive kappa carbides precipitation.

The hot-rolled product obtained by the process described above is cold-rolled after a pickling operation has been performed in the usual manner and pickling is preferred by sand blasting.

The first cold-rolling step is performed with a reduction rate between 30% and 80%, preferably between 40% and 70%.

After this rolling step, a first annealing is performed by heating the sheet up to an annealing temperature comprised between 700° C. and 1000° C., holding it at such temperature during less than 5 minutes and cooling it at a rate of at least 30° C./s, more preferably of at least 50° C./s and even more preferably of at least 70° C./s. Preferably, this annealing is carried out continuously.

By controlling annealing temperature and time, either a fully austenitic or a two phase structure with the characteristics above can be obtained.

After this first annealing step, pre-straining of the materials was performed by means of a second cold rolling step with a reduction rate between 10% and 50%, preferably between 15% and 40%. The steel sheet may have increased strength through strain hardening by undergoing this second cold rolling step.

After this second rolling step, a second annealing is performed by heating the sheet up to an annealing temperature comprised between 700° C. and 880° C., holding it at such temperature during 1 minutes to 150 hours and cooling it at a rate of at least 30° C./s, more preferably of at least 50° C./s and even more preferably of at least 70° C./s. Preferably, this annealing is carried out continuously. During this second annealing, the austenitic matrix is recovered and possibly recrystallized so that the dislocation density is being reduced. An indirect measurement of these evolutions is given by the full width at half maximum measured by X-ray diffraction on the diffraction peak corresponding the {311} planes. In the meantime, precipitation of hard phases, such as kappa carbides and ferrite, occurs. Moreover, ferrite could undergo an ordering reaction to promote $DO_3$ and B2. The combination of these microconstituents provides the steel with a compromise between ultra-high strength and ductility.

After those two annealing steps, the steel sheet may optionally be submitted to a metallic coating operation to improve its protection against corrosion. The coating process used can be any process adapted to the steel of the invention. Electrolytic or physical vapor deposition can be cited, with a particular emphasis on Jet Vapor Deposition. The metallic coating can be based on zinc or on aluminium, for example.

EXAMPLES

Two grades, which compositions are gathered in table 1, were cast in slabs and processed following the process parameters gathered in table 2.

TABLE 1

| Steel Sample | Compositions | | | | | | |
|---|---|---|---|---|---|---|---|
| | C | Mn | Al | P | S | N | Si |
| 1 | 0.92 | 19.2 | 8.65 | 0.009 | 0.003 | 0.006 | 0.05 |
| 2 | 0.96 | 19.9 | 5.72 | 0.007 | 0.005 | 0.007 | 0.05 |

TABLE 2

Process parameters

| Steel Sample | Trials | Reheating Temperature (° C.) | hot rolling finish temperature (° C.) | cooling rate (° C./s) | coiling temperature of HR Coil | cold rolling reduction |
|---|---|---|---|---|---|---|
| 1 | I1 | 1170 | 999 | 80 | 400 | 58 |
| 1 | I2 | 1170 | 999 | 80 | 400 | 58 |
| 1 | I3 | 1170 | 999 | 80 | 400 | 58 |
| 1 | I4 | 1170 | 999 | 80 | 400 | 58 |
| 2 | R1 | 1170 | 1000 | 75 | 400 | 58 |
| 1 | R2 | 1170 | 999 | 80 | 400 | 58 |
| 1 | R3 | 1170 | 999 | 80 | 400 | 58 |

| | | First Annealing | | | | Second Annealing | | |
|---|---|---|---|---|---|---|---|---|
| Steel Samples | Trials | Heating rate for Annealing 1 | Annealing 1 temperature | Holding time for annealing min | Cooling rate after annealing 1 | Cold rolling reduction-2 (%) | Heating rate for Annealing 2 | Annealing 2 temperature | Annealing 2 holding time (min) |
| 1 | I1 | 15 | 850 | 3 | 355 | 20 | 25 | 700 | 5 |
| 1 | I2 | 15 | 850 | 3 | 355 | 20 | 25 | 750 | 15 |
| 1 | I3 | 15 | 850 | 3 | 355 | 20 | 25 | 800 | 15 |
| 1 | I4 | 15 | 850 | 3 | 355 | 20 | 25 | 850 | 5 |
| 2 | R1 | 15 | 830 | 3 | 355 | 20 | 25 | 750 | 15 |
| 1 | R2 | 15 | 850 | 3 | 355 | 20 | 25 | 650 | 5 |
| 1 | R3 | 15 | 850 | 3 | 355 | 20 | 25 | 900 | 15 |

The resulting samples were then analyzed and the corresponding microstructure elements and mechanical properties were respectively gathered in table 3 and 4.

TABLE 3

The full width at half maximum FWHM of the austenite of the present invention is measured by X-ray diffraction on the diffraction peak corresponding the {311} planes. It corresponds to the broadening of the diffraction peak at half of its maximal intensity.

| Steel Samples | Trials | Ordered Ferrite (%) | Kappa Carbide (%) | Austenite (%) | FWHM of the {311} peak of austenite (°) |
|---|---|---|---|---|---|
| 1 | I1 | 4.9 | 3.5 | 91.6 | 0.998 |
| 1 | I2 | 5.6 | 1.6 | 92.8 | 0.917 |
| 1 | I3 | 5.2 | 1 | 93.8 | 0.821 |
| 1 | I4 | 4 | 0 | 96 | 0.708 |
| 2 | R1 | 0 | 0 | 100 | 0.606 |
| 1 | R2 | 4.7 | 2.7 | 92.6 | 1.129 |
| 1 | R3 | 0 | 0 | 100 | 0.647 |

TABLE 4

Properties

| Steel Samples | Trials | Yield strength (in MPa) | Tensile Strength (in MPa) | Tensile Elongation (in %) | Density |
|---|---|---|---|---|---|
| 1 | I1 | 1138 | 1306 | 19.0 | 6.81 |
| 1 | I2 | 1029 | 1221 | 21.2 | 6.81 |
| 1 | I3 | 1012 | 1195 | 25.6 | 6.81 |
| 1 | I4 | 753 | 1041 | 39.2 | 6.81 |
| 2 | R1 | 532 | 904 | 47.9 | 7.31 |
| 1 | R2 | 1217 | 1334 | 12.6 | 6.81 |
| 1 | R3 | 679 | 983 | 43.1 | 6.81 |

The examples show that the steel sheets according to the invention are the only one to show all the targeted properties thanks to their specific composition and microstructures.

What is claimed is:

1. A cold rolled and annealed steel sheet comprising by weight:
   0.6<C<1.3%,
   15≤Mn<35%,
   6≤Al<15%,
   Si≤2.40%
   S≤0.03%,
   P≤0.1%,
   N≤0.1%, and,
   optionally, one or more elements chosen among Ni, Cr and Cu in an individual amount of up to 3% and, optionally, one or more elements chosen among B, Ta, Zr, Nb, V, Ti, Mo, and W in accumulated amount of up to 2.0%, a remainder of the composition being made up of iron and inevitable impurities resulting from processing,
   a microstructure of the cold rolled and annealed steel sheet including, by volume fraction, ordered ferrite between 1% and 10%, and 1%<kappa carbides 10%, by volume fraction, the kappa carbides including both intragranular kappa carbides and intergranular kappa carbides, a remainder being austenite, a density of the steel sheet being equal or below 7.2 and an FWHM for the austenite matrix is between 0.700° and 1.100°, wherein FWHM is a measurement by X-ray diffraction of the full width at half maximum (FWHM) of the diffraction peak corresponding to the planes.

2. The cold rolled and annealed steel sheet as recited in claim 1, wherein the carbon content is between 0.8% and 1.0%, by weight.

3. The cold rolled and annealed steel sheet as recited in claim 1, wherein the manganese content is between 18% and 30%, by weight.

4. The cold rolled and annealed steel sheet as recited in claim 1, wherein the aluminum content is between 6% and 10%, by weight.

5. The cold rolled and annealed steel sheet as recited in claim 1, wherein the cold rolled and annealed steel sheet has an ultimate tensile strength of at least 1000 MPa and a yield strength of at least 700 MPa.

6. The cold rolled and annealed steel sheet as recited in claim 1, wherein the austenite content is between 90% and 98%, by volume fraction.

7. The cold rolled and annealed steel sheet as recited in claim 1, wherein the austenite content has an average grain size less than 12 microns.

8. The cold rolled and annealed steel sheet as recited in claim 1, wherein the austenite content has an average grain size less than 10 microns.

9. The cold rolled and annealed steel sheet as recited in claim 1, wherein the content of the ordered ferrite is between 2% and 10%, by volume fraction, having an average grain size less than 5 microns.

10. The cold rolled and annealed steel sheet as recited in claim 1, wherein the content of the ordered ferrite is between 3% and 9%, by volume fraction, having an average grain size less than 1 micron.

11. The cold rolled and annealed steel sheet as recited in claim 1, wherein the content of kappa carbides are is less than 5%, by volume fraction.

12. The cold rolled and annealed steel sheet as recited in claim 1, wherein the content of kappa carbides are is less than 4%, by volume fraction.

13. The cold rolled and annealed steel sheet as recited in claim 1, wherein the cold rolled and annealed steel sheet is covered by a metallic coating.

14. The cold rolled and annealed steel sheet as recited in claim 13, wherein the metallic coating is an aluminium-based coating or a zinc-based coating.

15. A method for manufacturing a structural or safety part of a vehicle comprising using the cold rolled and annealed steel sheet as recited in claim 1.

16. The cold rolled and annealed steel sheet as recited in claim 1, wherein the cold rolled and annealed steel sheet includes 1%<kappa carbides<5%, by volume fraction, the kappa carbides including both intragranular kappa carbides and intergranular kappa carbides.

17. The cold rolled and annealed steel sheet as recited in claim 1, wherein the cold rolled and annealed steel sheet includes 1%<kappa carbides<4%, by volume fraction, the kappa carbides including both intragranular kappa carbides and intergranular kappa carbides.

\* \* \* \* \*